United States Patent [19]
Yamaguchi

[11] Patent Number: 5,476,230
[45] Date of Patent: Dec. 19, 1995

[54] CAP FOR SPINNING REEL

[75] Inventor: Nobuyuki Yamaguchi, Tokyo, Japan

[73] Assignee: Daiwa Seiko, Inc., Tokyo, Japan

[21] Appl. No.: 429,005

[22] Filed: Apr. 26, 1995

Related U.S. Application Data

[63] Continuation of Ser. No. 145,620, Nov. 4, 1993, abandoned.

[30] Foreign Application Priority Data

Nov. 9, 1992 [JP] Japan ................... 4-082973 U

[51] Int. Cl.⁶ ............................................. A01K 89/01
[52] U.S. Cl. ................................ 242/311; 242/319
[58] Field of Search ........................ 242/311, 310, 242/312, 316, 319

[56] References Cited

U.S. PATENT DOCUMENTS 4,821,978   4/1989   Kaneko ................... 242/310
4,830,306   5/1989   Tsunoda et al. ........... 242/316

FOREIGN PATENT DOCUMENTS 55-2781   1/1980   Japan.
2-17071   2/1990   Japan.
3-8182    2/1991   Japan.

*Primary Examiner*—Joseph J. Hail, III
*Attorney, Agent, or Firm*—Longacre & White

[57] ABSTRACT

In a fishing reel, an elastically deformable cap side engagement of an annular cap is elastically engaged with a main body side engagement portion on a rear projection portion formed in a reel main body rotatably supporting a rotary shaft and accommodating therein a take-up drive mechanism, in order to retain the cap on the projection portion with simple manner.

4 Claims, 5 Drawing Sheets

CAP FOR SPINNING REEL

This is a continuation of application Ser. No. 08/145,620, filed Nov. 4, 1993, which was abandoned upon the filing hereof.

BACKGROUND OF THE INVENTION

The present invention relates to a spinning reel for fishing, and in particular to a cap mounted on a projecting rear portion of a spinning reel for protective or sealing property.

A conventional spinning reel has the following construction: A reel main body rotatably supports a rotary shaft of a handle and contains therein a take-up drive mechanism. The reel main body generally has a rear portion which is projected backwardly so as to store therein the rear end portion of a spool shaft and the like. In Japanese Patent Examined Publication No. Hei. 3-8182, there is disclosed a structure in which part of the projected portion is cut away to enable the repair of the reel or the like therethrough, and further a cap is securely attached to the reel by an external screw to cover the cutaway portion.

Also, in Japanese Utility Model Unexamined Publication No. Hei. 2-17071, there is disclosed a structure in which a cover is attached over the above-mentioned projected portion in order to close a hole formed behind the rear end of a traverse cam shaft, and is retained thereto with a screw like a long through bolt which extends inside the reel main body.

However, in either of the cap mounting methods disclosed in the above-mentioned respective publications, because the screw must be used to fix the cap, the number of components and the labor for assembling the same are increased to deteriorate the manufacture of the reel in efficiency. Also, there is an adverse possibility that slime, mucus or the like attached to hands can be attached to the screw during fishing, to thereby stain the reel.

On the other hand, in Japanese Utility Model Examined Publication No. Sho. 55-2781, there is disclosed a guard which covers the projected rear portion of a reel in order to prevent the reel rear portion from being damaged or rusted. However, the guard is mounted on a reel main body in such a manner that a nameplate formed integrally with the guard is fixed to the reel main body by means of screwing, staking, adhering means or the like.

SUMMARY OF THE INVENTION

In view of the above-mentioned conventional circumstances, it is an object of the invention to provide an arrangement for a spinning reel whereby a cap can be easily mounted onto and removed from a rear projected portion of a reel main body to improve working efficiency.

In attaining the above-noted and other objects, the present invention provides an arrangement for covering a rearward projection of a spinning reel for fishing reel, which includes: a main body side engagement portion formed in the rearward projection; a cap formed substantially in an annular shape and adapted to be mounted around the rearward projection; and an elastically deformable cap side engagement portion provided on the cap and engageable with the main body side engagement portion, wherein when the cap is located in place on the rearward projection, the cap side engagement portion is elastically engaged with the main body side engagement portion to retain the cap thereto.

DETAILED DESCRIPTION OF THE PREFERRED EMBODIMENTS

Description will be given below in more detail of the present invention by way of embodiments respectively shown in the accompanying drawings.

Figure 1:
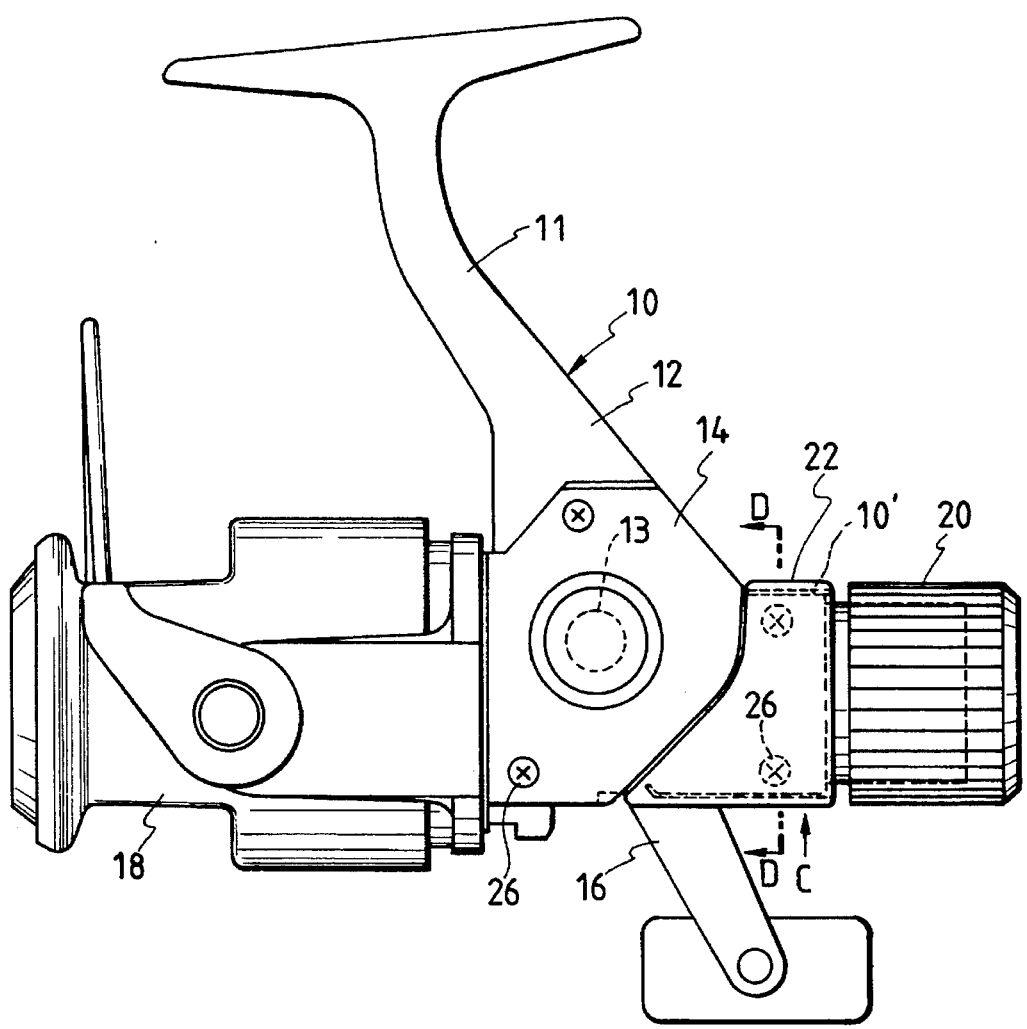
FIG. 1 is a side view of a first embodiment of a spinning reel according to the invention.
Figure 2:
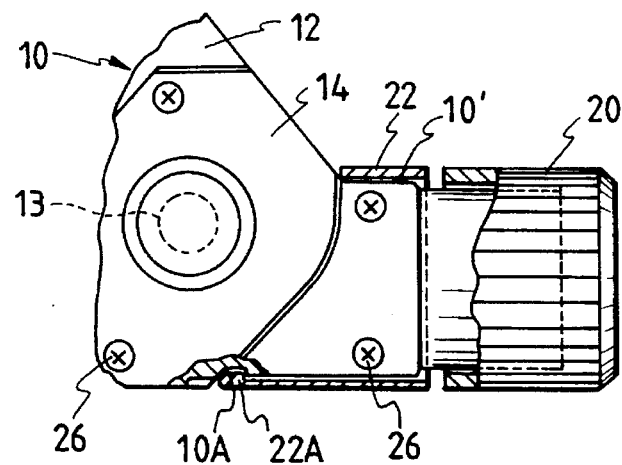
FIG. 2 is a partially broken view of the main portions of the reel shown in FIG. 1.
Figure 3:
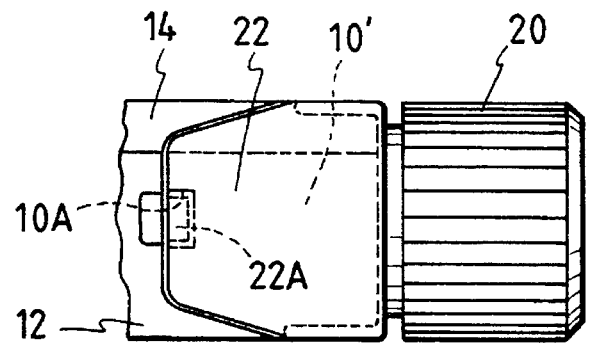
FIG. 3 is a partially bottom view of the reel shown in FIG. 1, taken along the arrow line C in FIG. 1.
Figure 6:
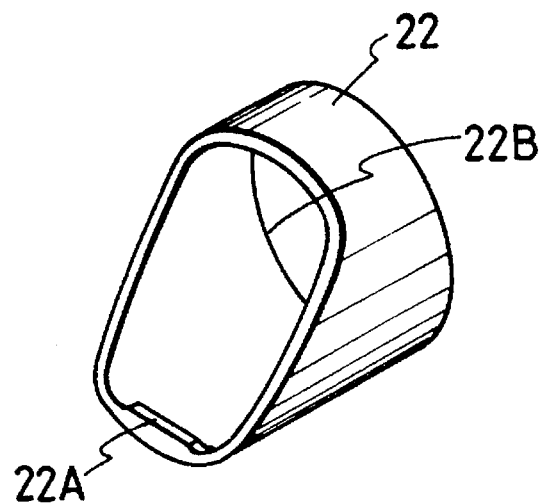
FIG. 6 is a perspective view of a cap employed in the reel shown in FIG. 1.

FIGS. 1 and 6 shows a spinning reel for fishing according to a first embodiment of the present invention. As shown in the respective figures, the present spinning reel includes a reel main body 10 which rotatably supports a rotary shaft 13 of a handle 16 and contains therein a take-up drive mechanism (not shown) for taking up a fishing line (not shown) onto a spool 18. The reel main body 10 includes a body portion 12 integral with a reel leg, and a body cover 14 attached thereto.

Figure 4:
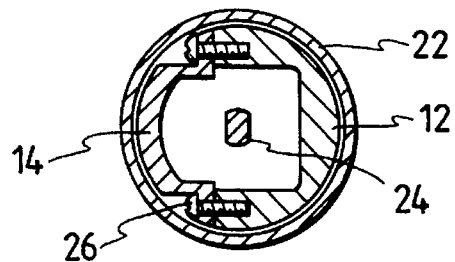
FIG. 4 is a transverse section view of the reel shown in FIG. 1, taken along the arrow line D in FIG. 1.
Figure 5:
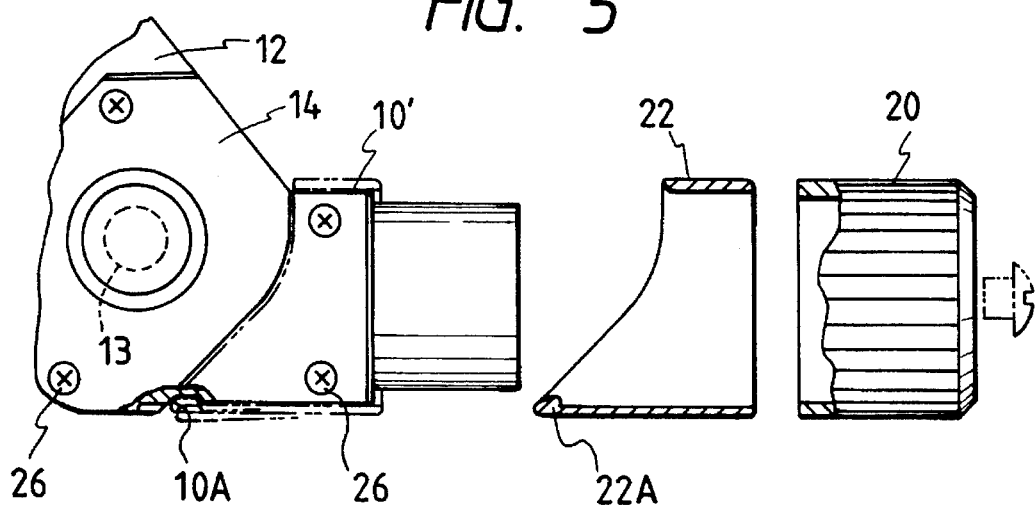
FIG. 5 is a partially sectional exploded view of the main portions of the reel shown in FIG. 1.

The spool 18 is supported on the reel main body 10 by a spool shaft 24 (FIG. 4) which passes through the reel main body 10 and is used to drive the spool 18 back and forth relative to the main body. The rear portion 10' of the reel main body 10 is generally formed in a projection shape in order to store the rear end portion of the spool shaft 24 and the like. In order to assemble or repair the internal reel mechanism parts, in general, it is necessary that the reel main body 10 can be disassembled and thus, as mentioned above, the reel main body 10 is made up of the body portion 12 and the body cover 14 serving as a lid or cover for the body portion 12. The body cover 14 is mounted by use of a screw 26.

Therefore, the screw 26 appears on the surface of the projection portion 10' which is the rear portion of the reel main body 10, and the existence of the screw 26 on the surface of the projection portion 10' can impair the beautiful appearance of the reel, and further, in fishing, the slime that is adhered to an angler's hand is likely to attach to the screw 26 so that the reel can be stained. To solve this, a cap 22 is put on the projection portion 10'. The present invention is characterized by the mounting structure of the cap 22.

In the present embodiment, in order to prevent the fishing line from being cut due to the strong pulling force given by fish, to the rear end portion of the reel, there is mounted a drag knob 20 which controls the intensity of a resisting force produced when the spool 18 is rotated. Therefore, in the rear portion of the cap 22, as shown in FIG. 6, there is formed a hole 22B, which makes it possible to mount the drag knob 20 to the further rearward reel end portion after the cap 22 is mounted onto the projection portion 10'.

For mounting the cap 22 onto the reel main body 10, the reel main body 10 includes on the bottom surface thereof a recess 10A serving as a main body side engagement portion and, correspondingly, the cap 22 includes a projection-like cap side engagement portion 22A. The cap 22 is formed of a resin material and thus can be deformed elastically. Therefore, when the cap 22 is put onto the projection portion 10' from the rear portion of the reel, the cap side engagement portion 22A is elastically deformed outwardly to be engaged with the recess 10A at a position opposed to the recess 10A. In repairing the reel or in other operations, to remove the above engagement, a driver or the like may be inserted into the recess 10A to push up the cap side engagement portion 22A outwardly.

As described above, due to the fact that the elastically deformable cap side engagement portion 22A is provided in the cap 22, the cap can be engaged in one touch of a finger manner with the recess 10A formed in the projection portion or rear portion 10' of the reel main body 10. This enhances the operationability of mounting the cap.

Figure 7:
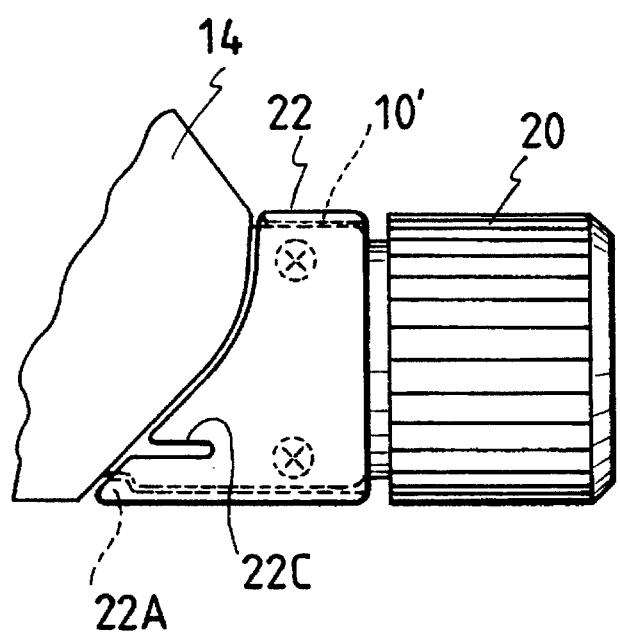
FIG. 7 is a side view of the main portions of a second embodiment of a reel according to the invention.

Next, FIG. 7 shows main portions of a spinning reel according to a second embodiment of the invention, in which there is formed a slit 22C at a suitable position in order to facilitate the elastic deformation of a cap side engagement 22A provided in the cap 22.

Figure 8:
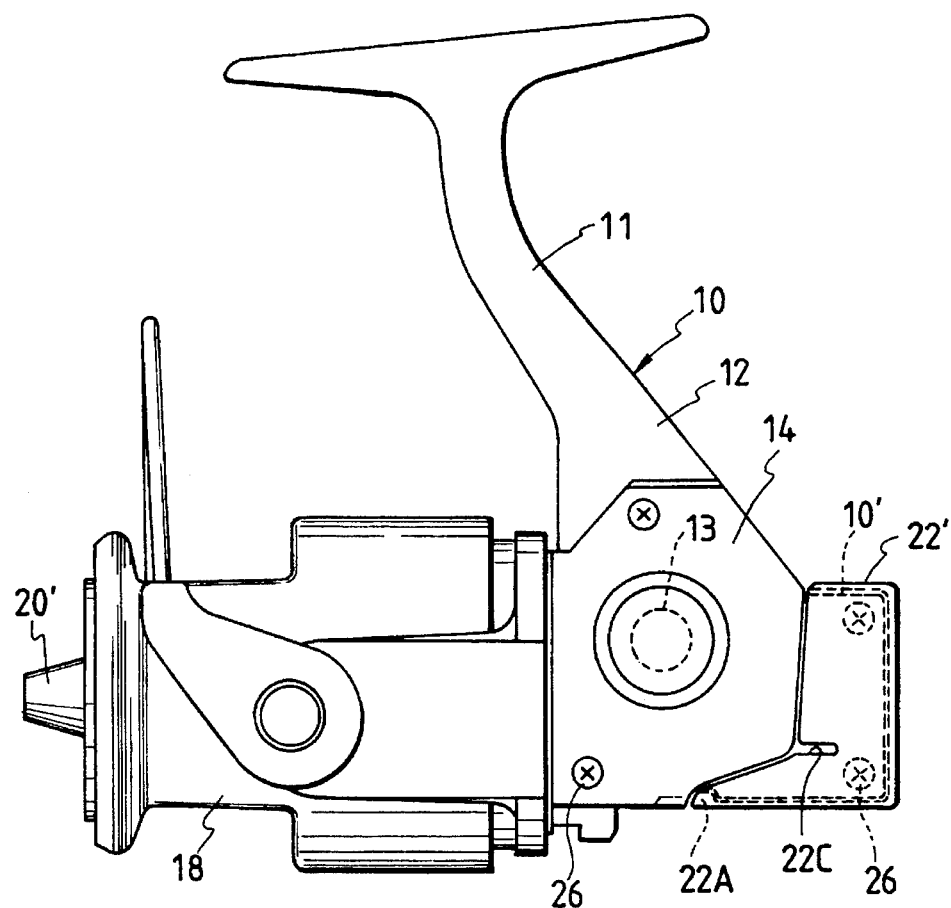
FIG. 8 is a side view of a third embodiment of a reel according to the invention.
Figure 9:
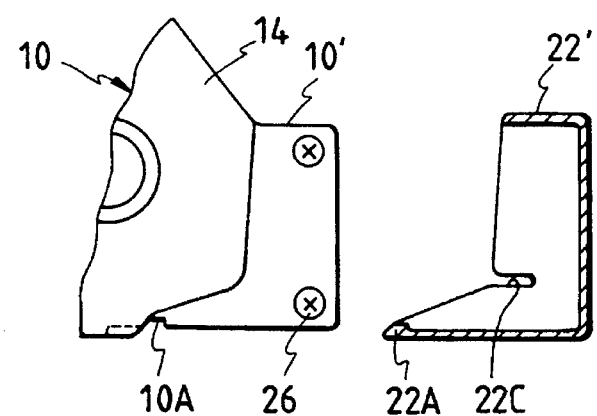
FIG. 9 is a partially sectional exploded view of the main portions of the reel shown in FIG. 8.

Further, in FIGS. 8 and 9, there is shown a third embodiment of the invention. The third embodiment is different from the above-described first and second embodiments in that a drag knob 20' performing the same operation as that of the drag knob 20 shown in FIG. 1 is disposed in the front end of the spool 18 rather than in the rear end portion of the reel. For this reason, there is eliminated the need for provision of the hole 22B as shown in FIG. 6 in the rear portion of a cap 22' and the cap rear portion is closed so as to cover sufficiently the projection portion 10' which is the rear portion of the reel. Thanks to this, even when the present reel is viewed from behind, the existence of the cap 22' contributes to the enhancement of the beautiful appearance of the present reel.

Figure 10:
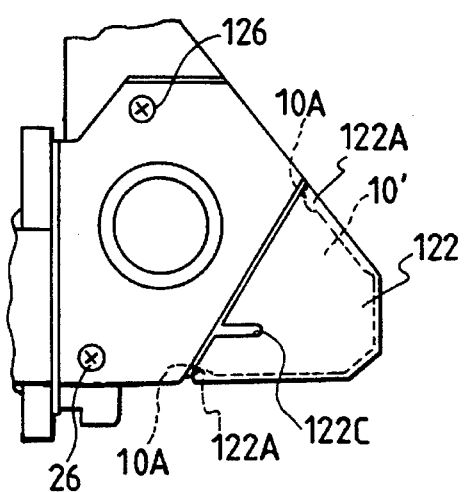
FIG. 10 is a side view showing main portions of a fourth embodiment of the present invention.

FIG. 10 shows a fourth embodiment of the present invention. The cap 122 of the fourth embodiment is formed into the substantially tapered or conical configuration. The rear portion 10' of the reel main body 10 is provided with two engagement recesses 10A whereas the cap 122 has two engagement projections 122A corresponding in location to the engagement recesses 10A when the cap 122 is mounted onto the rear portion 10'. The slit 122C is formed in the cap 122 to facilitate the elastic deformation of the cap 122.

Figure 11:
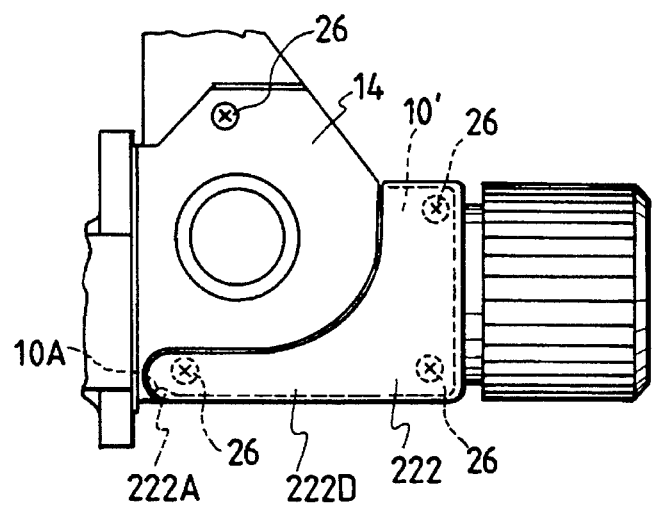
FIG. 11 is a side view showing main portions of a fifth embodiment.

FIG. 11 shows a fifth embodiment of the present invention, in which the lower portion of the cap 222 is elongated to form a portion 222D which protects the lower portion of the reel main body 10 positively and which covers screws 26 located at the lower portion of the reel main body 10. The engagement projection 222A of the cap 222 is formed on an end portion of the elongated portion 222D.

Figure 12A:
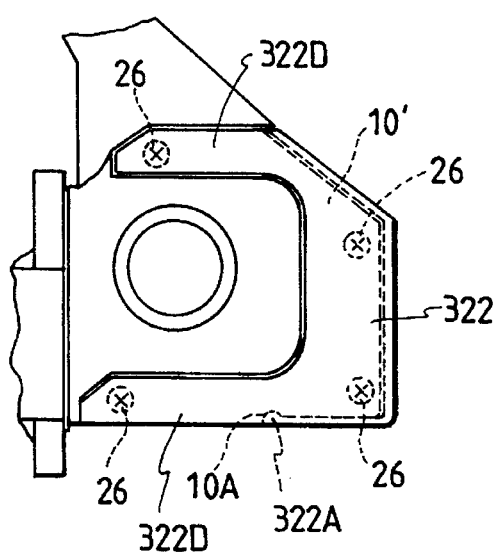
FIG. 12A is a side view showing main portions of a sixth embodiment.
Figure 12B:
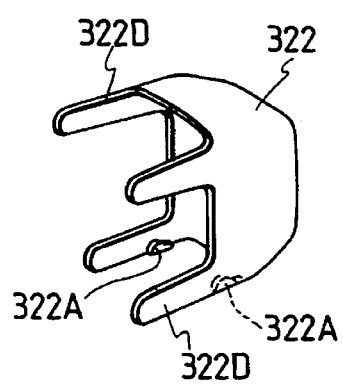
FIG. 12B is a perspective view showing a cap according to the sixth embodiment.

FIGS. 12A and 12B show a sixth embodiment of the present invention in which the cap 322 has four elongated portions 322D. The cap 322 with the elongated portions 322D can cover all of the mounting screws 26 which is used to fix the body cover 14 onto the main body 10. The engagement projection 322A is formed on the relatively proximal portion of each of two lower elongated portion 322D, rather than the distal thereof. A slit may be formed on the cap 322 to facilitate the elastic deformation of the cap 322 as similarly to the embodiment shown in FIG. 10.

In the illustrated embodiments, there is shown a spinning reel of an open face type. However, the present invention is not limited to this, but a spinning reel of a closed face type can also be used. Also, as to the resin, various kinds of resin such as nylon system resin, ABS resin and the like can be used. The shape of the cap is formed according to the projection shape of the reel main body rear portion and the cap can be formed not only in a circular shape but also in a non-circular shape such as an annular shape, an ellipsoidal shape, a substantially quadrilateral shape and the like.

As can be clearly understood from the foregoing description, according to the invention, because an elastically deformable cap side engagement portion is provided in a cap, the cap can be engaged with an engagement portion formed on the surface of the projection portion or rear portion of a reel main body with one touch of a finger. This enhances the operationability of the cap mounting. Further, since the screw is not exposed outside the reel, the mucus or the like is prevented from adhering onto the screw. Furthermore, when the cap of the present invention is used to enhance the sealing property in the rear projection portion, it is preferable that a rubber is used as a material of the cap to provide the more tight contact between the projection portion and the cap.

What is claimed is:

1. An arrangement for circumscribing a rearward projection of a spinning reel for fishing, the rearward projection includes a main body side engagement portion, said arrangement comprising:

a cap having a substantially annular shape and removably mounted around the rearward projection to cover at least one retaining means provided on the spinning reel, said cap includes a hole through which a support portion for a drag control knob extends; and an elastically deformable cap side engagement portion provided on said cap and removably engaged with said main body side engagement portion, wherein said cap side engagement portion includes a claw received in a recess of the body side engagement portion;

wherein said cap side engagement portion elastically engages the main body side engagement portion to retain said cap in place on the rearward projection.

2. The arrangement according to claim 1, wherein said cap comprises a slit means for facilitating elastic deformation of said cap side engagement portion.

3. An arrangement for circumscribing a rearward projection of a spinning reel for fishing, the rearward projection includes a main body side engagement portion and an opening covered with a lid retained on the reel by at least one screw, said arrangement comprising:

a cap having a substantially annular shape and removably mounted around the rearward projection, said cap includes a hole through which a support portion for a drag control knob extends; and an elastically deformable cap side engagement portion provided on said cap and removably engaged with said main body side engagement portion;

wherein said cap side engagement portion elastically engages the main body side engagement portion to retain said cap in place on the rearward projection, and wherein said annular cap sealingly covers over the at least one screw.

4. An arrangement for circumscribing a rearward projection of a spinning reel for fishing, the rearward projection includes a main body side engagement portion, said arrangement comprising:

a cap having a substantially annular shape and removably mounted around the rearward projection to cover at least one retaining means provided on the spinning reel, said cap includes a hole through which a support portion for a drag control knob extends; and an elastically deformable cap side engagement portion provided on said cap and removably engaged with said main body side engagement portion, said cap side engagement portion includes a projection claw received in a corresponding recess in the main body side engagement portion, wherein said projection claw elastically engages said corresponding recess to retain said cap on the rearward projection.

* * * * *